May 17, 1949.  J. L. SAYERS  2,470,373
JOINTING OF FLEXIBLE PIPES

Filed June 12, 1945  2 Sheets-Sheet 1

INVENTOR:
JOHN LAWRENCE SAYERS
By Eugene E. Stevens
His ATTORNEY

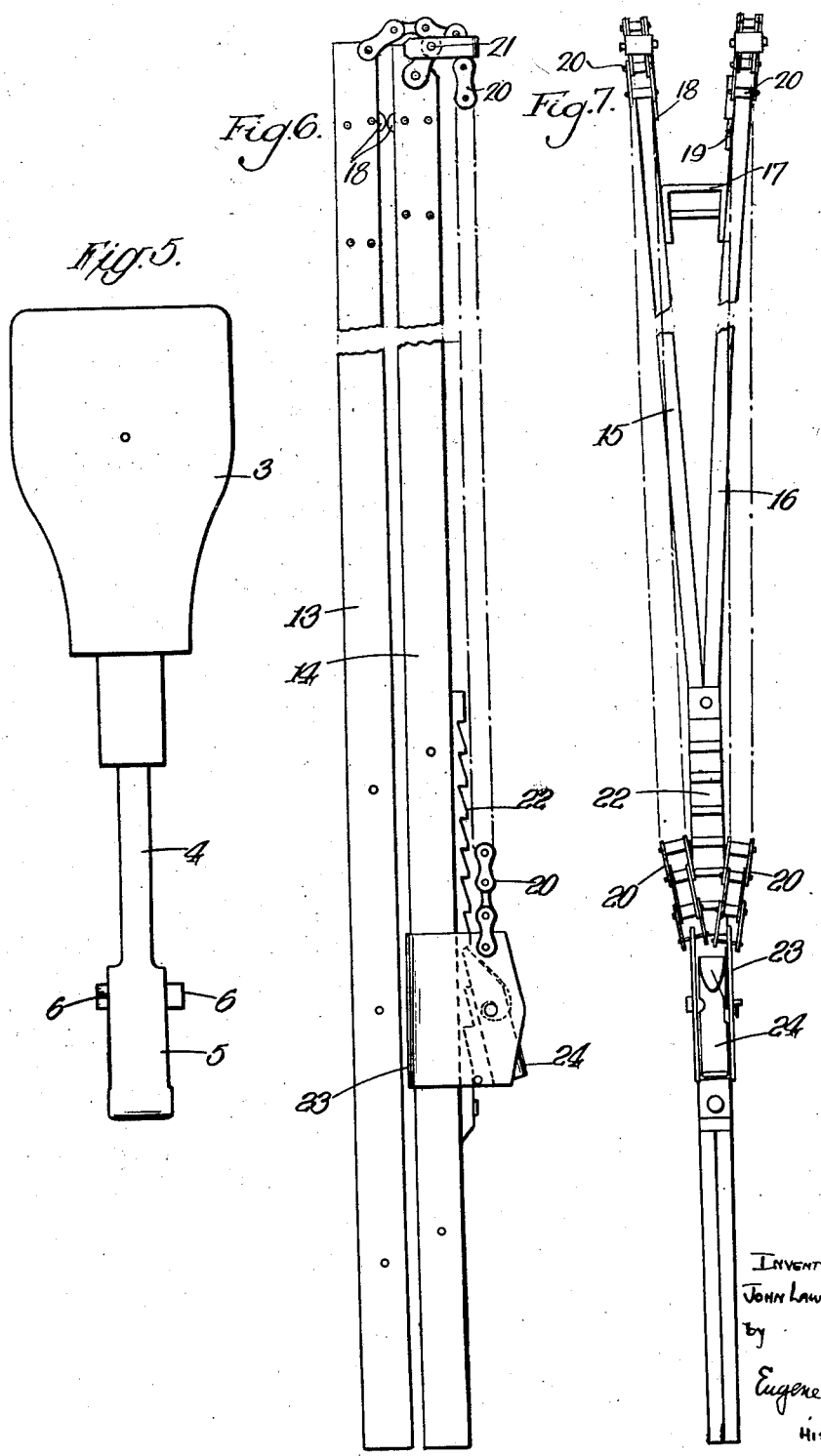

Patented May 17, 1949

2,470,373

UNITED STATES PATENT OFFICE 2,470,373

JOINTING OF FLEXIBLE PIPES

John Lawrence Sayers, Watford, England, assignor to Arnold Greening, Sparrows Herne, Bushey, England Application June 12, 1945, Serial No. 598,976
In Great Britain July 13, 1944

7 Claims. (Cl. 285—193)

This invention relates to the jointing of flexible pipes such as lead pipes.

The ends of lead pipes are usually connected together by a lead joint which usually takes about one hour to complete.

The object of the present invention is to provide a coupling and a method by which the adjacent ends of flexible pipes, such as lead pipes can be jointed in about a quarter of the time usually required for jointing flexible pipes, thus effecting a considerable economy in time and labour.

According to the present invention a coupling for connecting together the ends of flexible pipes is provided with a split sleeve having external tapered ends, which a pair of sockets have tapered bores, these sockets being adapted to be drawn together over the tapered ends of the sleeve.

A method of connecting together the adjacent ends of two flexible pipes consists in cutting the ends of the pipes substantially at right angles to the longitudinal axis of the pipes fitting a ferrule substantially equi-distant into the adjacent ends of the two pipes, fitting a longitudinally split sleeve having tapered ends over the pipe ends so as to extend over the joint between the two pipe ends, drawing sockets having conical bores, towards one another from opposite ends of the sleeve, and locking the two sockets together in their drawn-up position.

In order that the internal diameter of the pipes may not be reduced by the ferrule, their bores are preferably enlarged at the end for a length and depth corresponding with at least half the length of the ferrule and the thickness of the ferrule.

The ferrule is preferably coated externally with enamel or other suitable material to ensure a water-tight joint being formed.

For locking the sockets together their adjacent faces are provided with male and female parts which on their inter-engaging peripheral surfaces are formed with registering annular grooves, the female member being provided with one or more holes which extend from the outside thereof to the registering grooves, the hole or holes being tangential to the grooves, a wire pin or the like being passed into the hole or holes and engaging with the grooves.

The sockets are preferably drawn together by an appliance by means of which considerable leverage can be applied to the sockets for moving them towards one another along the split sleeve.

The invention will now be described by way of example with reference to the accompanying drawings, wherein:

Fig. 5 shows in elevation a tool for enlarging the end of the bore in a pipe.

Figs. 6 and 7 show views at right angles to one another of a tool used in jointing lead pipes.

Figure 1:
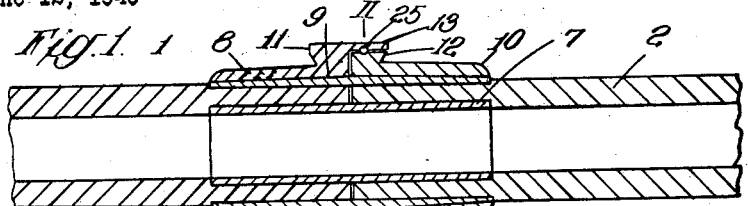
Fig. 1 shows a sectional view of a joint.

As shown in Fig. 1 two lead pipes 1, 2 to be jointed together at their adjacent ends have ends cut as near as possible at right angles to the longitudinal axis of the pipes. The ends of the bores of the pipes, 1, 2 are then enlarged in diameter by a tool, shown in Fig. 5. The tool is provided with a handle, a stem 4 and a boss 5. The boss 5 fits with a slight clearance in the bore of the pipes 1, 2 and serves to guide the tool whilst the bore is being enlarged by means of one or more cutters 6 which are provided on the boss 5 at or near the end thereof adjacent to the stem 4.

The length and depth of the enlargement of the bore are preferably such as to receive half the length and the full thickness of a ferrule 7 so that the diameter of the through flow passage in the pipe assembly remains constant.

For the purpose of connecting together the two pipes 1, 2 the ferrule 7 is fitted into the end of one pipe for example the pipe 1. On the end of the pipe 1 is now plugged freely a socket 8 provided with a conical bore, whilst a split sleeve 9, tapering on the outside towards both ends, is fitted for half its length on the outside of the pipe 1.

A socket 10 is placed freely on the end of the pipe 2.

The sockets 8, 10 are each provided with a shoulder 11, 12 preferably inclined towards one another as shown in Fig. 1.

The socket 8 is provided with an annular flange 13, forming a female part, for receiving the end of the socket 12 which forms the male part.

The end of the pipe 2 is fitted over the ferrule 7 and into the split sleeve 9, one half of the ferrule 7 engages with each pipe 1, 2 whilst one half of the split sleeve 9 fits over each pipe 1, 2.

The sockets 8, 10 are now drawn towards one another, over the opposite ends of the split sleeve 9, as far as possible by hand.

The sockets 8, 10 are now drawn into the position shown in Fig. 1 by means of the tool shown in Figs. 6 and 7. As shown in these figures the tool consists of two member 13, 14 each of which is preferably formed by two metal bars 15, 16 (Fig. 7) suitably secured together at one end, for example by rivets, and splayed apart at their other end by a channel bracket 17.

At the splayed end of each member 13, 14 are provided two projections 18, 19 adapted to engage with substantially diametrically opposite points of the shoulders 11, 12.

The spacing apart of the ends of the members, 13, 14 provided with the projections 18, 19 is adjusted by means of chains 20 connected at one end to the member 13 and passing around rollers 21 at the ends of the member 14, the other ends of the chains 20 being connected to a rack 22 passing through a guide 23 secured to the other end of the member 14. With the rack co-operates a spring actuated pawl 24 for adjusting the length of the chains 20.

As will be appreciated the sockets 8, 10 are drawn together by pushing the free ends of the members 13, 14 towards one another. The members 13, 14 are made of the required length to provide the necessary leverage.

The flange 13, of the socket 8, and the socket 10 are provided in their adjacent surfaces and in registering positions, when the sockets are in the position shown in Fig. 1 with annular grooves 25, 26. The flange 13 is provided with one or more holes such as 27, which leads or lead tangentially into the registering grooves 25, 26. Through the hole or holes 27 and the grooves 25, 26 are adapted to be passed one or more wires, 28 for securing the sockets 8, 10 in the engage position.

Figure 3:
Fig. 3 is a partial cross section of a modified arrangement on the line II—II of Fig. 1.

As shown in Fig. 3 the hole 27 may extend completely through the flange 13 so that a pin or the like may be passed therethrough for engagement with the grooves 25, 26.

Figure 4:
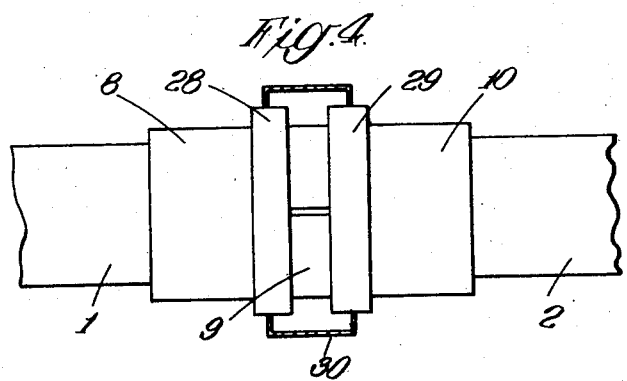
Fig. 4 shows in elevation a modified form of joint before the final closure.

In the modification shown in Fig. 4 the sockets 8, 10 are provided with flanges 28, 29 which, after having been drawn together as above described, are adapted to be locked together by a band, such as 30, such as used for example for securing lids to containers.

When enlarging the bores of the pipes lubricant is used freely but is removed before the ferrule 7 is inserted. A film of oil is preferably provided between the split sleeve 9 and the sockets 8, 10.

The ferrule 7 is preferably coated on the outside with enamel or other suitable material for ensuring a watertight joint.

Figure 8:
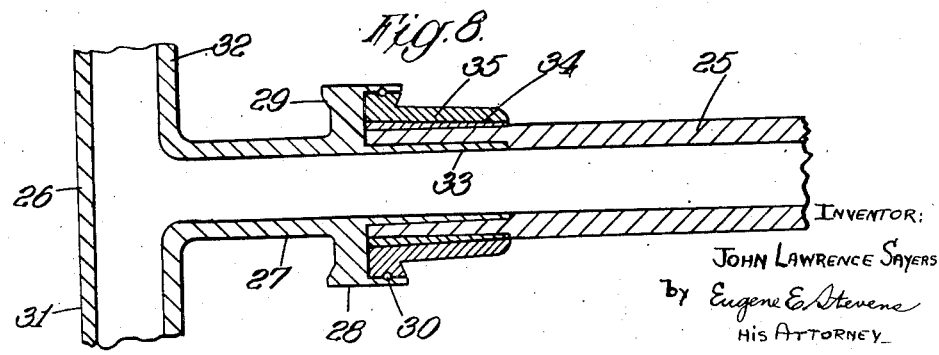
Fig. 8 shows a sectional view of a modification of the joint.

In the modified form of construction shown in Fig. 8 a lead pipe 25 is connected to a T-piece 26 which may be in the form of a brass casting. The limb 27 of the T-piece is provided with a flange 28 which is provided with a shoulder 29 and with a rim 30. The ends 31, 32 may be constructed in the same manner as the limb 27, for the connection of further pipes, or one or both of these ends 31, 32 may be screw threaded for receiving a tap.

The limb 27, or one or both the ends 31, 32 when a pipe such as 25 is to be secured thereto, is provided with a projecting ferrule 33 of which the bore is of the same internal diameter as the bore of the limb 27.

The bore of the pipe 25 is enlarged in the manner above described for fitting over the ferrule 33.

Over the end of the pipe 25 is fitted a split tapered sleeve 34, whilst over the sleeve 34 is fitted a socket 35. The socket is of the same construction as the socket 10 above described in connection with Figs. 1 to 3.

The socket 35 is drawn against the flange 28 in the same manner as above described in connection with the sockets 8, 10 above described.

Figure 2:
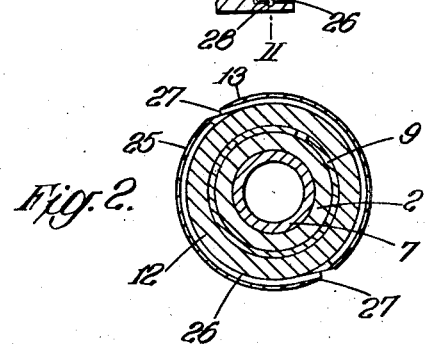
Fig. 2 is a cross section on the line II—II of Fig. 1.

The flange 28 and socket 35 are secured together in the same manner as above described in connection with the sockets 8, 10 shown in Figs. 1 to 3 or in the manner above described in connection with Fig. 4.

Although the arrangement described in connection with Fig. 8 has been described more specifically in connection with a T-piece, it will be understood that the same arrangement may be adopted in connection with other fittings such as a rigid pipe or bend or whenever a flexible pipe, such as a lead pipe is to be connected to a rigid pipe.

As will be appreciated from the foregoing lead pipes can be connected together by the method according to the present invention in a very short period of time thus having a considerable advantage over the usual lead joints, especially as regards economy in time and labour.

I claim:

1. A coupling for connecting together the ends of flexible pipes, wherein a split sleeve is provided with external tapered ends, whilst a pair of sockets have tapered bores, these sockets being adapted to be drawn together over the tapered ends of the sleeve, and a circumferential outwardly projecting shoulder carried by each socket adjacent the inner ends of same, said shoulders being adapted to be engaged by a clamping tool.

2. A coupling for connecting together the ends of flexible pipes, wherein a split sleeve is provided with external tapered ends, whilst a pair of sockets have tapered bores, these sockets being adapted to be drawn together over the tapered ends of the sleeve, said sockets being provided on their adjacent faces with male and female portions which on their interengaging peripheral surfaces have registering annular grooves, the female member being provided with one or more holes which extend from the outside thereof to the registering grooves, the hole or holes being tangential to the grooves, a wire pin or the like being passed into the hole or holes and engaging with the grooves.

3. A coupling for connecting together the ends of flexible pipes, wherein a split sleeve is provided with external tapered ends, whilst a pair of sockets have tapered bores, these sockets being adapted to be drawn together over the tapered ends of the sleeve, a circumferential outwardly projecting shoulder carried by each socket adjacent the inner ends of same, said shoulders being adapted to be engaged by a clamping tool, and clip means engaging said shoulders for retaining the sockets against separating movement.

4. A pipe section-connecting joint comprising a pair of pipe sections providing substantially contiguous meeting ends, the meeting ends of said pipes being internally counter-bored, a ferrule snugly fitting in the counter-bored ends of said pipe sections and approximating the internal diameter thereof, a split sleeve extending across the joint between said sections and snugly embracing the outer surfaces of the same, the exterior of said sleeve being tapered from adjacent its midportion to its outer ends and throughout its exterior circumference, a collar slidable from each pipe section onto the proximate tapered end of said split sleeve for binding the same to the subjacent pipe section, and each collar having a circumferential shoulder adjacent its inner end adapted to be engaged by pressure-applying means for actuating the collars toward one another, one of said collars having at its inner end an axially projecting flange adapted to contiguously overlie the adjacent portion of the shoulder of the other collar, said flange and second mentioned collar having opposed circumferentially extending grooves traversing at least a substantial portion of the circumference of said flange and shoulder and providing a locking means-receiving passage, and said flange having a tangentially extending hole aligned with said passage and communicating with the same, and a wire insertable into said passage, whereby to prevent separation of said collars.

5. The combination set forth in claim 4, and the outer walls of said collar shoulders being undercut to provide retaining engagement for a collar-compressing means.

6. A pipe section-connecting joint comprising a pair of pipe sections providing substantially contiguous meeting ends, one of said pipe sections providing an exterior circumferential shoulder at its junction with the inner end of the other pipe section, said shoulder having a circumferential flange extension overlying and spaced from the exterior diameter of the other pipe section, a split sleeve exteriorly embracing the second mentioned pipe section inwardly of the inner end of same, said sleeve being tapered to reduced thickness in the direction of its rear end, a wedge collar adapted to snugly embrace said sleeve and being internally tapered to correspond with the taper of said sleeve, said collar having an exterior circumferential shoulder underlying the projecting shoulder flange of the other pipe section, said flange and the shoulder of said collar cooperating to provide a locking means-receiving passage extending in the circumferential direction, and said flange having a tangentially extending opening aligned with said passage and communicating with same, and a locking wire engageable in said passage through said flange hole for locking the first mentioned pipe section against movement with respect to said collar and the other pipe section.

7. A pipe joint comprising pipe sections having meeting ends in substantially contiguous engagement with each other, circumferential outwardly extending shoulders at the meeting ends of said sections and made fast thereto, a split sleeve embracing at least one of said pipe sections, a clamp collar operatively engaging said sleeve to cause same to firmly grip its underlying pipe section, and one of said shoulders being carried by said sleeve, one of said shoulders having a circumferential flange overlying the other shoulder, said flange and last mentioned shoulder cooperating to provide a circumferentially extending locking element-receiving passage, and said flange having a tangential hole aligned with said passage and communicating with the same, and a locking wire insertable into said passage through said hole.

JOHN LAWRENCE SAYERS.

REFERENCES CITED

The following references are of record in the file of this patent:

UNITED STATES PATENTS

| Number | Name | Date |
| --- | --- | --- |
| 1,476,119 | Van Nagell | Dec. 4, 1923 |
| 1,843,202 | Buchanan | Feb. 2, 1932 |
| 2,253,018 | Cowles | Aug. 19, 1941 |
| 2,310,490 | Melsom | Feb. 9, 1945 |
| 2,310,536 | Melsom | Feb. 9, 1945 |
| 2,376,017 | Smallpeice | May 15, 1945 |